United States Patent [19]

Anderson et al.

[11] 4,450,081

[45] May 22, 1984

[54] TRANSMISSION FLUID FILTER AND METHOD OF MANUFACTURE

[75] Inventors: David L. Anderson, Muskegon, Mich.; Robert F. Hitchcock, Glendale Hts.; Robert M. Tamburrino, Chicago, both of Ill.

[73] Assignee: Sealed Power Corporation, Muskegon, Mich.

[21] Appl. No.: 284,078

[22] Filed: Jul. 16, 1981

[51] Int. Cl.³ ............................................. F01M 11/03
[52] U.S. Cl. ..................................... 210/445; 210/168; 210/455; 29/163.5 F; 264/DIG. 48
[58] Field of Search ...................... 210/168, 445, 455; 264/DIG. 48; 29/163.5 F

[56] References Cited

U.S. PATENT DOCUMENTS

| | | | |
|---|---|---|---|
| 2,808,937 | 10/1957 | O'Meara | 210/445 |
| 3,784,011 | 1/1974 | Ward | 210/168 |
| 4,136,011 | 1/1979 | Joseph et al. | 210/168 |
| 4,264,443 | 4/1981 | Anderson et al. | 210/168 |

Primary Examiner—Thomas G. Wyse
Attorney, Agent, or Firm—Barnes, Kisselle, Raisch, Choate, Whittemore & Hulbert

[57] ABSTRACT

An improved transmission fluid filter and a method of assembly wherein the filter comprises a plastic first member having a planar peripheral lip, and a sheet metal second member with a planar ledge and a continuous peripheral flange crimped over the cover lip and capturing the lip against the ledge. In accordance with the invention, a bead having an arcuate surface extends around the outside edge of the cover lip, and the flange is preformed in a continuous progressive bending or curling operation prior to engagement with the bead.

15 Claims, 14 Drawing Figures

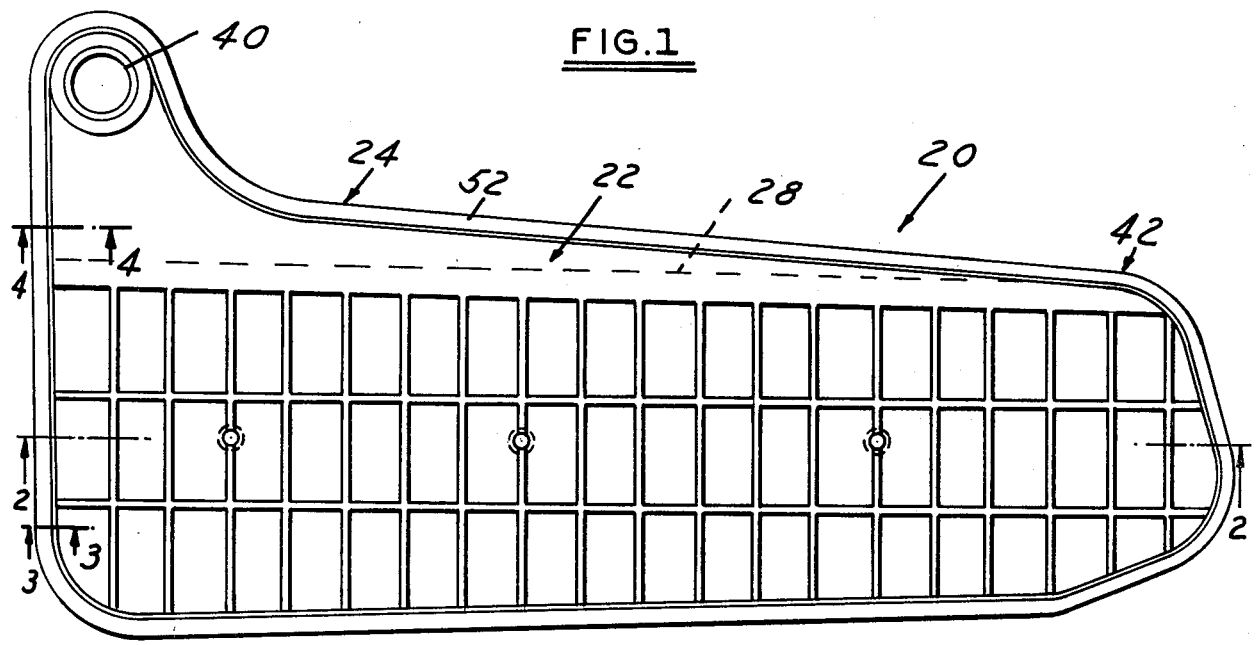
FIG.1
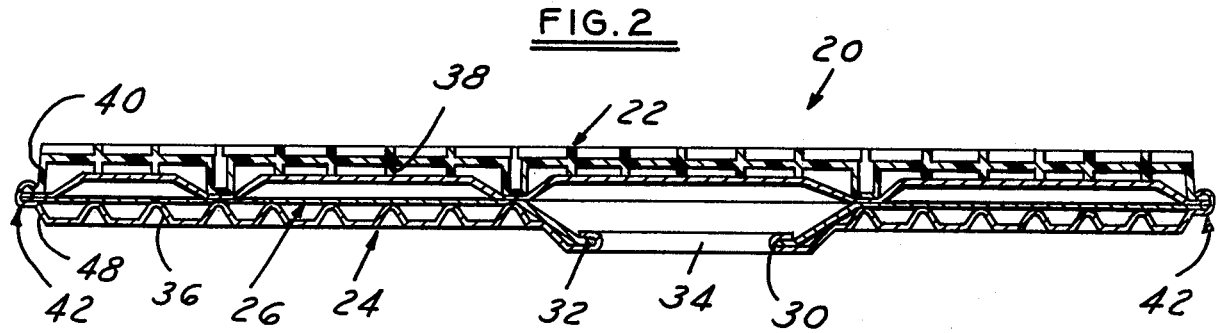
FIG.2
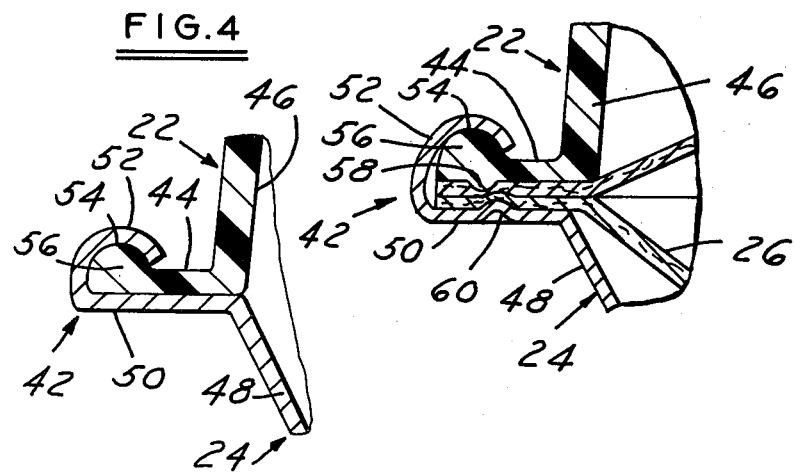
FIG.3
FIG.4

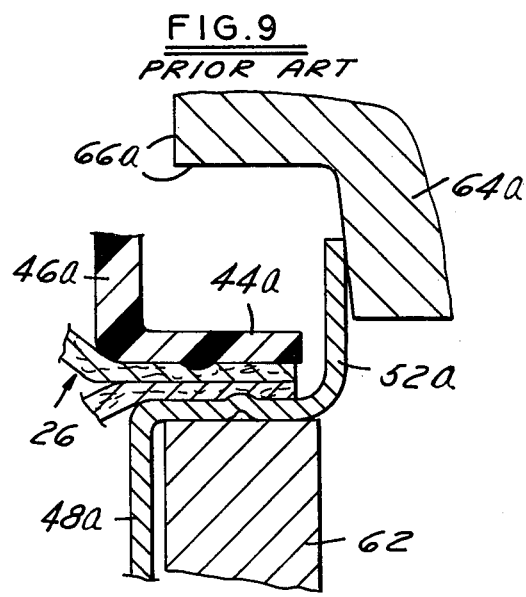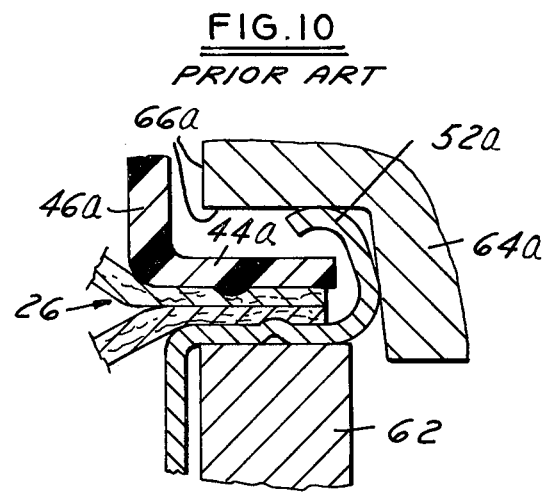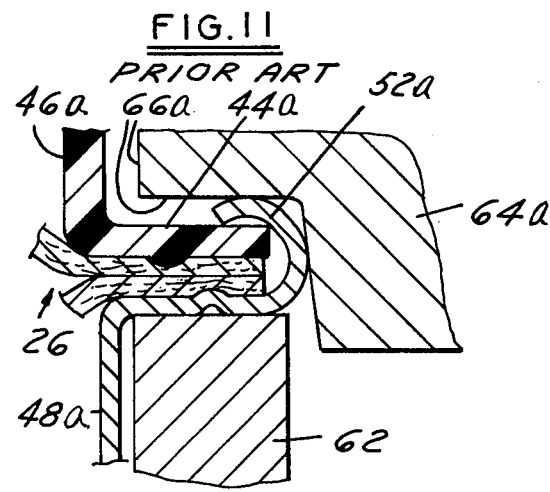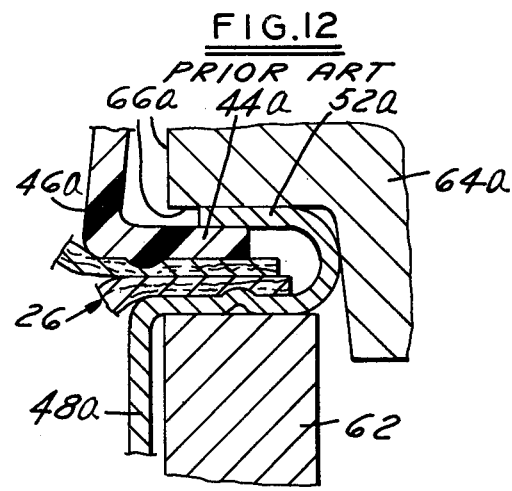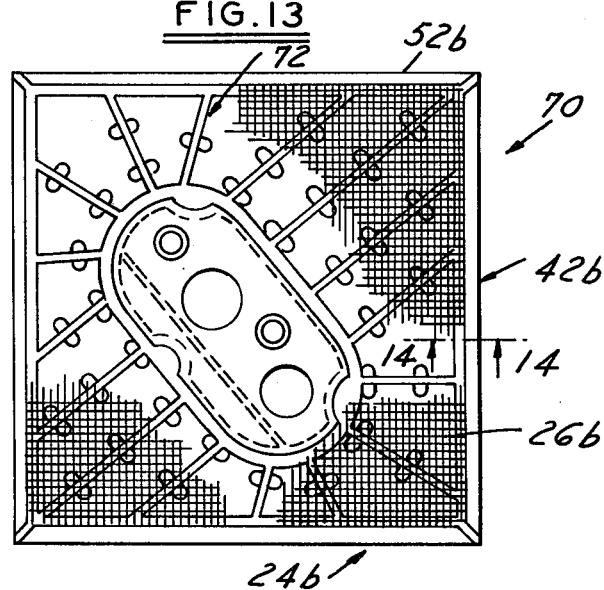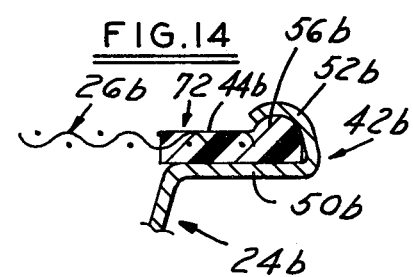

TRANSMISSION FLUID FILTER AND METHOD OF MANUFACTURE

The present invention relates to filters for automotive transmission fluids, and particularly to transmission fluid filter assemblies of the type which comprise separate metal and plastic filter media support members, and to methods for manufacture thereof.

Transmission fluid filter assemblies of the type which comprise separate plastic and metal filter support members have heretofore been proposed in the art. Two examples of such filters are shown in U.S. Pat. No. 4,136,011. In general, such filters comprise a first member of molded plastic construction and an opposing member of sheet metal construction crimped about its periphery over a lip on the plastic member for defining a fluid cavity between the respective members and supporting a fluid filter media with respect to the fluid cavity.

Although transmission fluid filter assemblies of this type have enjoyed commercial success, problems have been encountered in effecting a satisfactory continuous peripheral crimp around the metal and plastic filter support members such as cracking in the side walls of the plastic member which we have discovered are due to lateral forces on the plastic member resulting from the crimping step. Gathering of the sheet metal flange material around corners of the periphery during the crimping operation and residual bending stresses in the plastic members resulting from the crimping operation may result in distortion of the plastic members, loss of effective sealing at the crimp joint and/or cracking of the plastic member.

An object of the present invention is to provide a transmission fluid filter of the type described above which overcomes the aforementioned problems in the art by substantially eliminating lateral forces on the plastic member of the filter and thereby provide reliable sealing at the filter periphery over an extended operating lifetime. Another object of the invention is to provide a method for manufacture of a transmission fluid filter in which the inherent tendency to induce undesirable residual stresses in or lateral forces on the plastic filter member is substantially reduced or eliminated.

The invention, together with additional objects, features and advantages thereof, will be best understood from the following description, the appended claims and the accompanying drawings in which:

FIG. 1 is a top plan view of a transmission fluid filter in accordance with one embodiment of the present invention;

FIG. 2 is a transverse sectional view taken along the line 2—2 in FIG. 1;

Figure 5:
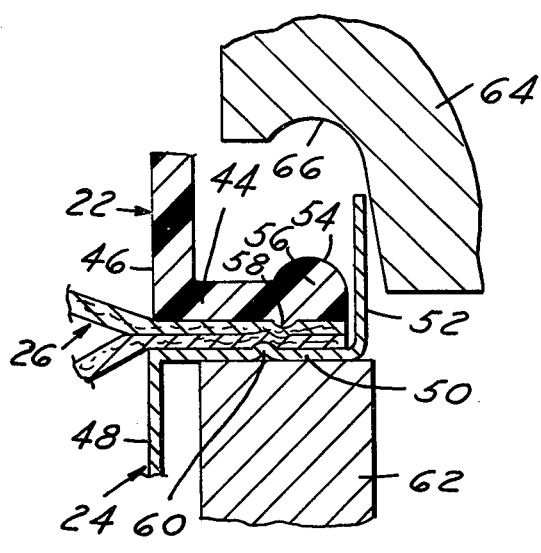
Figure 6:
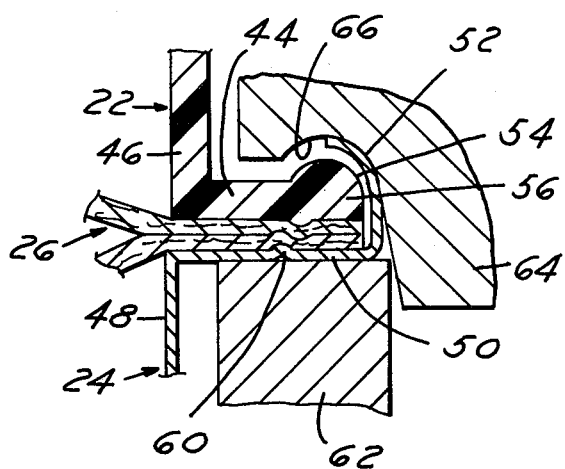
Figure 7:
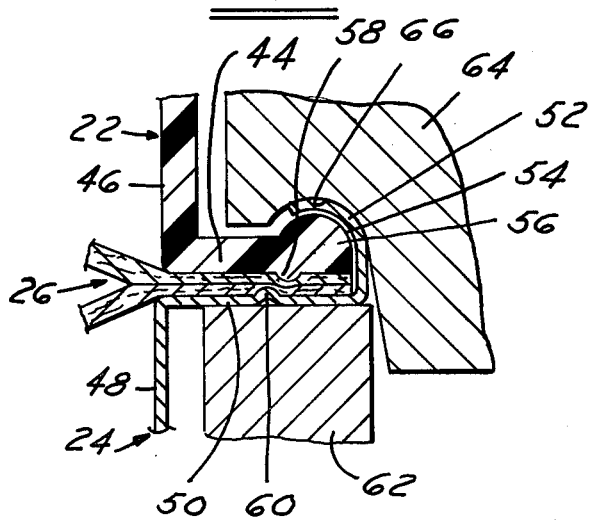

FIGS. 3 and 4 are sectional views on an enlarged scale taken along the respective lines 3—3 and 4—4 in FIG. 1;

FIGS. 5-8 are fragmentary essentially schematic illustrations of a method and apparatus for crimping the sheet metal filter member to the periphery of the plastic member at respective progressive stages in accordance with the invention;

FIGS. 9-12 are fragmentary essentially schematic illustrations similar to FIGS. 5-8 showing the peripheral crimping technique in accordance with the prior art;

FIG. 13 is a topplanview of a second embodiment of a transmission fluid filter in accordance with the invention; and FIG. 14 is a sectional view on an enlarged scale taken along the line 14—4 in FIG. 13.

FIGS. 1-4 illustrate one presently preferred embodiment 20 of a transmission fluid filter in accordance with the invention as comprising an upper cover 22 of molded plastic construction such as glass fiber-reinforced nylon and a lower pan 24 of stamped sheet metal construction. However, cover 22 can be made of any of the well-known numerous organic synthetic or processed materials that are mostly thermoplastic or thermosetting polymers that can be molded, cast, or extruded commonly called plastics such as phenol formaldehyde resins (Bakelite).

A sheet 26 of filter medium such as resin-impregnated felt is folded upon itself (as along the phantom line 28 in FIG. 1) and captured around its remaining periphery between cover 22 and pan 24 in a manner to be described hereinafter. An opening 30 is formed in filter medium 26 and is sealingly captured by a lip 32 extending around a corresponding opening 34 in pan 24 for defining an inlet for transmission fluid. The central portions of filter medium 26 are supported by bosses 36 stamped into base pan 24 and ribs 38 molded integrally with cover 22. An outlet 40 (FIG. 1) is molded into cover 22 for attachment to a suitable transmission pump section inlet (not shown) so as to draw transmission fluid through opening 34 into the region between the folded sheet sections fo filter medium 26, through the filter medium into the regions between the respective sheet sections and the opposing cover 22 and pan 24, and then to and through filter outlet 40.

Lower pan 24 is fastened to cover 22 by a continuous crimp indicated generally at 42 extending entirely around the opposing peripheries of the respective cover and pan members facing orthogonally of the plane of the lip. Crimp 42 also serves to capture the edges of filter medium 26 below fold line 28 in FIG. 1. As best seen in FIG. 3, cover 22 has an integral peripheral flange or lip 44 extending in a plane entirely around cover 22 substantially perpendicular to side wall 46. In the particular embodiment illustrated in FIGS. 1-3, cover 22 is generally in the form of an inverted cup having a continuous side wall 46 from which lip 44 projects. An upstanding bead 56 extends entirely around the outside edge of lip 44 and projects therefrom in a direction normal to the plane of the lip and away from pan 24. Bead 56 has an arcuate, preferably substantially semi-circular surface 54 at a predetermined radius of curvature. In the particular embodiment shown in the drawings, the radius of curvature of surface 54 is about twice the thickness of lip 44.

Base pan 24, which is dished in the embodiment of FIGS. 1-3 in opposition to the concavity of cover 22, has a continuous peripheral side wall 48 which terminates in a periphery continuous planar ledge 50. Ledge 50 has an integral flange 52 which is deformed over the arcuate surface 54 of bead 56 in sealing engagement therewith so as to capture the edges of the folded sections of filter media 26 between ledge 50 and lip 44. In the particular embodiment shown in FIGS. 1-4, a pair of offset opposing ribs 58,60 respectively extend around that portion of lip 44 and lodge 50 which capture the edges of filter media 26 for enhanced retention.

Figure 8:
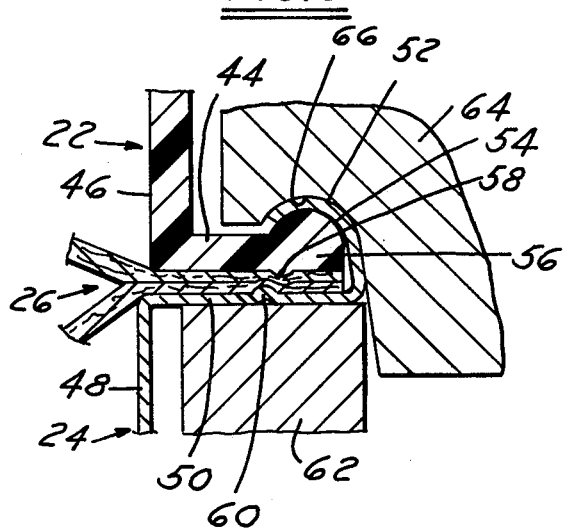

The preferred method of continuously progressively deforming flange 52 over bead 54 in accordance with the invention is illustrated in FIGS. 5-8. Initially (FIG. 5), flange 52 extends from base pan 24 in a direction perpendicular to the plane of ledge 50. Bead 56 is molded to possess the arcuate surface 54 at constant radius of curvature. Base pan 24 is placed on a fixed die having a continuous die section 62 for supporting ledge 50. Cover 22 is placed over pan 24 with lip 44 over ledge 50 and within flange 52 and with the edges of the folded filter medium 26 being disposed between lip 44 and ledge 50 as shown in FIG. 5. A spring-biased load (not shown) is then placed upon cover 22 to precompress medium 26 to about half of the original thickness as shown in the drawings. An anvil 64 then descends toward and in the direction of support die 62 through the stages successively illustrated in FIGS. 5-8. As anvil 64 descends, the entire free edge of flange 52 is progressively curled by an arcuate surface or groove 66 extending entirely around anvil 64 so that, prior to engagement with the opposing arcuate surface 54 of bead 56 as shown in FIG. 8, flange 52 is effectively performed or precurled by anvil 64 to a radius of curvature for arcuate facing engagement with bead 56.

It will be noted in particular with reference to FIGS. 5-8 in accordance with a critical feature of the method of the invention that bead 56 does not operate as an anvil or forming die for the deformation of flange 52. To the contrary, the flange is essentially preformed by anvil surface 66 and engages bead 56 only at the final stage of the flange-deforming operation (FIG. 8) in which forces exerted on bead 56 are in the direction of movement of anvil 64. Bead 56 has essentially the same arcuate configuration that flange 52 assumes during the crimping operation to prevent the end of metal flange 52 from embedding in the plastic bead 56 or lip 44 and thereby imparting lateral movement to the bead or lip 44. By lateral force is meant a force substantially parallel to lip 44 and ledge 50 in a direction inwardly of cover 22 or leftward as viewed in FIG. 5. This eliminates lateral forces on plastic cover 22. This may be contrasted with the prior art crimping technique illustrated progressively in FIGS. 9-12 wherein corresponding elements are designated by a suffix "a". An edge of flange 52a engages lip 44a at an intermediate stage of the crimping operation (FIG. 11), and thereafter digs into the ledge and deforms the cover 22a between the stages of operation illustrated in FIGS. 11 and 12. Thus, cover wall 46a in the prior art embodiment of FIGS. 9-12 is subjected to residual bending stresses in the lateral direction (as viewed in the drawing) during and following completion of the crimping operation. Such bending stresses lead to cracking of the cover and loss of filtering operation of the filter in the high temperature and vibration environment of an automotive transmission.

In the method of assembly in accordance with the invention illustrated in FIGS. 5-8 however, bead 56 and that portion of lip 44 immediately beneath bead 56 are subjected only to residual compressive stresses which help maintain a tight seal between flange 52 and bead 56, and hold the edges of filter medium 26 in place. Side wall 46 of cover 22 is substantially free of lateral force or residual bending stresses of the type characteristic of the prior art. In addition, deformation of flange 52 into engagement with bead 56 in accordance with the invention substantially reduces the tendency of the flange material to gather at the corner of the filter periphery due to an effective reduction of radius of curvature, and consequently reduces the likelihood of possible loss of effective sealing between the flange and lip. In the extended or linear portions of crimp 42 between curved corners of the filter, the crimp of the present invention has also been found to be stronger than that of the prior art in that greater force is required to pull the edges of medium 26 from between lip 44 and ledge 50.

It will be appreciated that the crimping operation illustrated at progressive stages in FIGS. 5-8 is preferably performed in one continuous operation simultaneously entirely around the filter periphery. Most preferably, the radii of curvature of anvil surface 66 and bead 56 are on centers vertically aligned during the forming operation so that, following initial contact of the flange 52 with the arcuate bead surface, further vertical motion of anvil 64 causes sliding movement of the flange edge along the arcuate surface (compressing bead 56 and the edges of filter medium 26) but no lateral movement between the metal and plastic members.

The design tolerances on cover 22 preferably are such that the situation illustrated in FIGS. 5-8, wherein the radii of surfaces 66,54 are vertically aligned, represents a nominally maximum dimension diametrically across the filter (FIG. 1). At a minimum nominal dimension wherein bead 56 is displaced slightly to the left as shown in FIGS. 5-8, performance of the crimping operation serves to center the cover with respect to the base pan and also stresses wall 46 outwardly or to the right in FIGS. 5-8. Such stresses are substantially less than those encountered in accordance with the prior art in FIGS. 9-12. Specifically, only five to ten thousandths of an inch of lateral movement have been experienced in operation of the invention, as compared with up to seventy thousandths experienced in practice of the prior art using the same part design tolerances.

It will be appreciated that flange 52 would tend naturally to assume an arcuate form if anvil 64 with groove 66 in FIGS. 5-8 were replaced by the anvil 64a in FIGS. 9-12 having the planar forming surface 66a. Indeed, an anvil 64a of the type shown in FIGS. 8-12 was initially utilized in reducing the invention to practice. It was found, however, that commercial design tolerances on sheet metal stock are such that the vertical centerline of the flange curl radius could not be controlled to insure the most desirable fit between the precurled flange and the bead surface radius. Employment of the groove 66 in anvil 64 (FIGS. 5-8) insures a predetermined curl radius regardless of variations in stock thickness.

FIGS. 13 and 14 illustrate one of the transmission fluid filter embodiments 70 shown in the above-referenced U.S. Pat. No. 4,136,011 modified to embody an improved peripheral crimp 42b in accordance with the invention. In particular, filter 70 includes a sheet metal base pan 24b having a peripheral ledge 50b and a flange 52b extending integrally therefrom. A filter medium 26b of woven polyester mesh, for example, is molded into a frame 72 of fiber-reinforced resin construction. Frame 72 includes a peripheral lip portion 44b with integral bead 56b over which flange 52b is deformed as previously described. With the exception of crimp 42b, filter 70 is identical to that illustrated in the noted patent, the disclosure of which is incorporated herein by reference.

It will be apparent from the foregoing discussion that the improved crimp between metal and plastic filter support members of a transmission fluid filter in accordance with the invention may be incorporated in filter constructions other than those illustrated in the drawings. Indeed, the invention is envisioned as having application to any transmission fluid filter construction wherein the filter housing or media support structure is comprised of dissimilar materials, such as metal and plastic, wherein an edge of the metal portion must be deformed or crimped over a corresponding edge of the plastic portion.

The invention claimed is:

1. In a transmission fluid filter comprising a first member of plastic construction, a second member of sheet metal construction, means about the periphery of said first and second members fastening said members to each other to form an internal fluid cavity and filter means carried by said members for filtering fluid during passage through said cavity, the improvement wherein said fastening means about the periphery of said first and second members comprises a bead integrally extending around the periphery of said first member, said bead having an arcuate surface facing in a direction away from said second member, and a flange integrally extending from said second member over said arcuate surface around the peripheries of said first and second members sealingly capturing said bead.

2. The filter set forth in claim 1 wherein said first member includes an integral lip extending continuously around the periphery of said first member in a plane, said bead projecting from said plane.

3. The filter set forth in claim 2 wherein said second member includes a peripheral ledge, and wherein said flange extends from said ledge and captures said lip and bead against said ledge.

4. The combination set forth in claim 3 wherein said flange extends inwardly of said periphery around said periphery.

5. The combination set forth in claim 4 wherein said periphery includes at least one straight portion, and wherein the portion of said flange crimped over said bead in said straight portion of said periphery is substantially stress free in the direction of said straight portion.

6. The combination set forth in claim 5 wherein said periphery includes at least one outside corner, wherein said flange is continuous entirely around said periphery, and wherein the portion of said flange at said inside corner is compressed in the direction of said periphery.

7. The combination of claim 1 wherein the flange is crimped about said bead and the plastic first member is substantially free of lateral forces.

8. In a method of manufacturing a transmission fluid filter which includes the steps of providing separate sheet metal and plastic filter members and crimping an integral peripheral flange on said sheet metal member over a peripheral lip on said plastic member around the peripheries of the respective said members, the improvement for reducing residual stresses in said plastic member wherein said step of providing said plastic filter member includes the step of forming a continuous bead around said lip, and wherein said step of crimping said flange over said lip comprises the step of deforming said flange onto said bead around said peripheries sealingly to capture said bead.

9. The method set forth in claim 8 wherein said bead has an arcuate surface, wherein said step of forming said flange comprises the step of precurling said flange in a continuous progressive forming operation to possess a radius of curvature upon engagement with said bead which is substantially equal to the radius of curvature of said arcuate surface, and wherein forces exerted on said bead by said flange are substantially normal to the plane of said lip.

10. The method set forth in claim 9 wherein the step of precurling said flange is accomplished by progressively engaging a free edge of said flange against an arcuate forming surface.

11. A transmission fluid filter comprising a first member of molded plastic construction having a continuous planar lip integrally extending about its periphery and an integral bead extending around an outside edge of said lip having an arcuate bead surface facing orthogonally of said planar lip, a second member of sheet metal construction having a continuous planar ledge, integrally extending about its periphery and a flange projecting integrally from said ledge about said periphery, said flange arcuately extending over said bead and sealingly capturing said bead and lip against said ledge, and fluid filter means carried by said members.

12. The filter set forth in claim 11 wherein said filter means comprises a separate sheet of filter media sealingly captured between said lip and said ledge.

13. The filter set forth in claim 11 or 12 wherein said molded plastic member includes a circumferentially continuous wall from which said lip orthogonally extends, and wherein said wall is substantially unstressed.

14. In the method of making a transmission filter comprising a molded plastic member and a sheet metal member with filter media therein, the method of assembly which comprises providing a flange on said metal member surrounded by an axially extending wall, providing an integral planar flange on said metal member on said plastic member complementary to said flange, providing an bead on the surface of said flange on said plastic member opposite to the surface facing said flange on said metal member, said bead having an arcuate radial cross section, progressively applying an axial force to said wall surrounding said flange of said metal member and bending said flange radially inwardly to form an arcuate portion having an arcuate radial cross section complementary to the arcuate radial cross section of said bead, and continuing the application of said axial force to said arcuate portion to cause said arcuate portion to slide circumferentially along said arcuate surface of said bead to provide a seal between said plastic member and said metal member.

15. In the method of making a transmission filter comprising a molded plastic member and a metal member with filter media therein, the method of assembly which comprises providing an integral planar ledge on said metal member surrounded by an axially extending flange, providing an integral planar flange on said plastic member complementary to said ledge on said metal member, providing a bead on the surface of said flange on said plastic member opposite to the surface facing said ledge on said metal member, said bead having an arcuate radial cross section, engaging said flange of said metal member with a first die having an annular concave surface generally complementary to said bead, engaging said ledge of said metal member with a second die, and progressively moving said first die and second die axially together relative to one another to cause said flange of said metal member to first be deformed into an arcuate configuration complementary to said arcuate cross section of said bead, thereafter to contact said bead in arcuate surface engagement such that forces of engagement between said deformed flange and said bead are primarily parallel to the direction of said relative movement, and finally to slide along said arcuate bead to seal said plastic member to said metal member.

* * * * *

UNITED STATES PATENT AND TRADEMARK OFFICE
CERTIFICATE OF CORRECTION

PATENT NO. : 4,450,081
DATED : May 22, 1984
INVENTOR(S) : David L. Anderson, Robert F. Hitchcock, Robert M. Tamburrino It is certified that error appears in the above-identified patent and that said Letters Patent are hereby corrected as shown below:

Column 2, line 1 - no spacing between "topplanview"

Column 2, line 17 - new paragraph started
Column 2, line 31 - "fo" should be --of--
Column 2, line 65 - "lodge" should be --ledge--
Column 3, line 66 - "corner" should be --corners--
Column 6, line 14 - delete comma (,) after "ledge"
Column 6, claim 14, lines 32, 33, 34 - should read:
   --providing an integral planar flange on
   said plastic member complementary to said
   flange on said metal member,--
instead of:
   --providing an integral planar flange on
   said metal member on said plastic member
   complementary to said flange,--

Signed and Sealed this

Second Day of April 1985

[SEAL]

Attest:

DONALD J. QUIGG

*Attesting Officer*     *Acting Commissioner of Patents and Trademarks*